United States Patent [19]

Muruyama et al.

[11] Patent Number: 5,271,430
[45] Date of Patent: Dec. 21, 1993

[54] FLOW RATE CONTROL VALVE DEVICE AND FLOW FORCE REDUCTION STRUCTURE

[75] Inventors: Jun Muruyama; Koji Yamashita, both of Kawasaki, Japan

[73] Assignee: Kabushiki Kaisha Komatsu Seisakusho, Tokyo, Japan

[21] Appl. No.: 920,160

[22] Filed: Jul. 27, 1992

Related U.S. Application Data

[60] Division of Ser. No. 813,042, Dec. 23, 1991, abandoned, which is a continuation of Ser. No. 474,035, Jun. 18, 1990, abandoned.

Foreign Application Priority Data

Aug. 16, 1988 [JP] Japan .................. 63-107440

[51] Int. Cl.$^5$ .............................................. F16K 1/36
[52] U.S. Cl. .................. 137/625.3; 137/625.34; 137/484.4; 251/129.08
[58] Field of Search ........... 137/625.3, 625.37, 625.34, 137/484.4; 251/129.08

[56] References Cited

U.S. PATENT DOCUMENTS

| | | | |
|---|---|---|---|
| 1,120,118 | 12/1914 | Ashlock | 137/625.3 |
| 3,791,413 | 2/1974 | Muller et al. | |
| 4,245,816 | 1/1981 | Johnson | 137/625.3 |
| 4,314,585 | 2/1982 | Nishimiya et al. | |
| 4,316,599 | 2/1982 | Bouvet et al. | |

FOREIGN PATENT DOCUMENTS

| | | | |
|---|---|---|---|
| 57-161383 | 10/1982 | Japan | |
| 59-56469 | 4/1984 | Japan | |
| 62-31742 | 8/1987 | Japan | |
| 148576 | 10/1931 | Switzerland | 137/625.3 |

Primary Examiner—Arnold Rosenthal
Attorney, Agent, or Firm—Armstrong, Westerman, Hattori, McLeland & Naughton

[57] ABSTRACT

A flow rate control valve device for controlling and then supplying fluid under pressure to an actuator such as an hydraulic cylinder or the like which includes a valve body having a drain port kept at a low pressure and a main spool slidably mounted in the valve body to connect or disconnect the drain port with a pressure chamber. Notch grooves are formed on an outer peripheral surface of the main spool. A spring is interposed between the valve body and the main spool to urge the spool to a valve body seat. A pushing device is provided for pushing the main spool against the resilient force of the spring. A plate member is provided on the main spool in the drain port for causing pressurized flow through the notch grooves to flow first in a substantially radial direction of the main spool and subsequently into the drain port so part of the pressurized fluid impinges on the plate member for exerting a force urging the main spool in the direction disengaging the spool from the seat against a force of the spring and a flow force acting between the spool and the seat for at least cancelling the flow force.

5 Claims, 6 Drawing Sheets

FIG.IIA

FIG.IIB

FIG.IIC

5,271,430

FLOW RATE CONTROL VALVE DEVICE AND FLOW FORCE REDUCTION STRUCTURE

This is a division of application Ser. No. 07/813,042 filed on Dec. 23, 1991, now abandoned, which is a continuation of Ser. No. 07/474,035 filed on Jun. 18, 1990, now abandoned.

TECHNICAL FIELD OF THE INVENTION

This invention relates to a flow rate control valve device mounted as a constituent element on a construction equipment and adapted for controlling the flow rate of fluid under pressure supplied by a pressurized fluid supply source into a pressure chamber of an actuator such as, for example, a hydraulic cylinder for driving a work implement and a hydraulic motor or the like, and more particularly, to a pressure compensating type flow control valve device and a flow force reduction structure constructed so as to reduce the flow force.

BACKGROUND ART OF THE INVENTION

Figure 1:
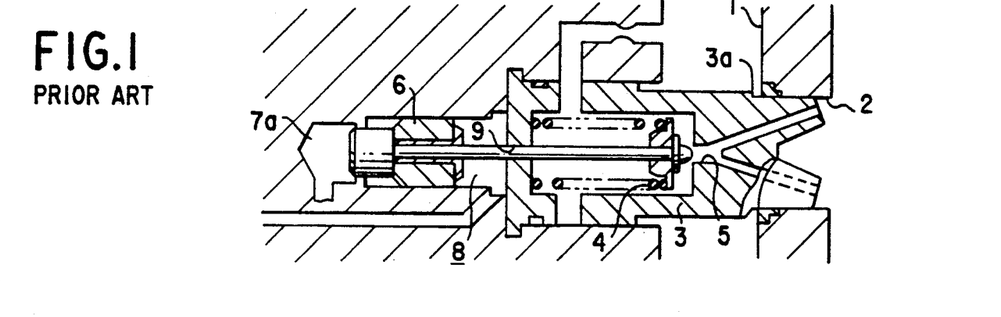
FIG. 1 is a schematic, sectional view of a prior art flow rate control valve device.

A flow rate control valve device is so far known which is arranged as shown in FIG. 1 such that a main poppet 3 is provided to connect or disconnect a main port 1 for flow rate controlling purposes with or from a drain port 2, and the main poppet 3 is biased by a spring 4 to its cut-off position and has a drain hole 5 formed therein and adapted to communicate the main port 1 with the low pressure drain port 2, the drain hole 2, the drain hole 5 being arranged to be opened and closed freely by a stem 7 adapted to be moved by a pilot piston 6, the pilot piston 6 being moved by a pilot pressure within a pilot pressure chamber 8 so as to move the stem 7 to open the drain hole 5 to thereby cause fluid flow from the main port 1 into the drain port 2, and the main poppet 3 being moved through the action of a high pressure fluid exerted on a shoulder 3 of the main poppet 3 against the resilient force of the spring 4 so as to discharge fluid under pressure from the main port 1 into the drain port 2 thereby controlling the fluid flow through the main port 1.

Such a flow rate control valve is arranged such that the pilot piston 6 is displaced by the pilot pressure so as to cause a displacement of the main poppet 3 to thereby control the flow rate of fluid under pressure, however, it is disadvantageous in that its response is poor because there is a time difference between the commencement of the inflow of fluid under pressure and the occurrence of a change in the flow rate of fluid under pressure flowing therethrough.

Further, this flow rate control valve is arranged such that the stem 7 is moved by a pilot pressure supplied into a back pressure chamber 7a formed in the rear part thereof so as to control the fluid pressure within the spring chamber of the main poppet 3 to thereby control the rate of pressurized fluid flow therethrough. Therefore, provision of a pilot pressure supplying mechanism is required so that the system per se becomes complicated in structure, and also not only errors in supply of the pilot pressure bring about changes in the stroke of the stem 7, but also leakage of fluid under pressure through a sliding portion 9 of the stem 7 into the pilot pressure chamber 8 is liable to occur, thus rendering it impossible to control the flow rate of fluid under pressure at a high accuracy.

SUMMARY OF THE INVENTION

The present invention has been devised in view of the above-mentioned circumstances in the prior art, and has for its object to provide a flow rate control valve device wherein sliding movements of a main spool adapted to connect or disconnect a main port for flow rate controlling purposes with or from a drain port can be made accurately, finely and at an excellent response so as to enable the flow rate of fluid under pressure to be controlled at a high accuracy.

Another object of the present invention is to provide a pressure compensating type flow rate control valve device wherein fluid flow can be generated at a flow rate which is in proportion to the magnitude of the thrust given to the main spool, but independent of the fluid pressure in the main port.

A further object of the present invention is to provide a flow rate control valve device wherein the fluid pressure within a pilot pressure chamber for pushing the main spool so as to communicate the main port with the drain port can be set at a flow value, and also even when the pressure differential between the main port and the drain port is increased so as to increase the flow force exerted on the main spool, there is no possibility of the main spool moving in such a direction as to cut off the communication between the main port and the drain port so that the rate of pressurized fluid flow therethrough can be controlled at a high accuracy.

A still further object of the present invention is to provide a flow force reduction structure for use in a spool valve wherein even spools having small diameters can be fabricated readily.

To achieve the above-mentioned objects, according to a first aspect of the present invention, there is provided a flow rate control valve device comprising: a main spool slidably mounted in a valve hole perforated in the valve body thereof in such a manner that a main port for flow rate controlling purposes which communicates with a pressure chamber of an actuator may be connected with or disconnected from a drain port kept at a low pressure which communicates with a fluid reservoir, the main spool having a plurality of notch grooves formed axially on the peripheral surface of a large diameter portion formed on one side thereof, and a seat formed on one end side thereof; a spring interposed between the innermost end face of the valve hole and one end face of the main spool and adapted to bias the seat formed on the main spool in such a direction as to allow the seat to make pressure contact with a seat poppet formed on the valve body; and a pushing means for pushing the main spool from the side of the other end face thereof against the resilient force of the spring so as to disengage the seat formed on the main spool from seat poppet formed on the valve body and allow the main port to communicate through the notch grooves with the drain port.

According to a second aspect of the present invention, there is provided a flow rate control valve device as set forth in the above-mentioned first aspect, characterized in that the pushing means is an electrical actuator having a movable rod adapted to engage with the other end face of the spool so as to give a thrust to the main spool.

According to a third aspect of the present invention, there is provided a flow rate control valve devide as set forth in the above-mentioned first aspect, characterized in that the seat is a truncated-conical seat formed integrally with the main spool and having a truncated-conical surface.

According to a fourth aspect of the present invention, there is provided a flow rate control valve device as set forth in the above-mentioned first aspect, characterized in that said seat is a spherical seat formed integrally with the main spool, and said seat proppet is a spherical seat poppet.

According to a fifth aspect of the present invention, there is provided a flow rate control valve device as set forth in the above-mentioned first aspect, characterized in that the seat is a separately formed seat which is fixedly secured through a retainer to one end face of the main spool by tightening a nut mounted thereon.

According to a sixth aspect of the present invention, there is provided a flow rate control valve device as set forth in the above-mentioned first aspect, characterized in that the seat and the large diameter portion on one side of the main spool are formed in an axially spaced apart relationship by a predetermined distance with each other.

To achieve the above-mentioned objects, according to a seventh aspect of the present invention, there is provided a flow rate control valve device as set forth in the above-mentioned first aspect, characterized in that the pushing means for causing fluid under pressure to flow from the main port through the clearance between the seat and the seat poppet and into the drain port comprises a pressure chamber in which the other end portion of the main spool is accommodated, and a pilot pressure supplying means for supplying pilot fluid under pressure from a pilot pump.

According to an eighth aspect of the present invention, there is provided a flow rate control valve device as set forth in the above-mentioned seventh aspect, characterized in that the main spool is provided at one end thereof with a piece of plate for causing pressurized fluid flow from the main port towards the drain port to flow once substantially radially of the main spool and then into the drain port so that the fluid under pressure may transmit a force to the main spool in such a direction as to disengage the seat from the seat poppet.

According to a ninth aspect of the present invention, there is provided a flow rate control valve device as set forth in the above-mentioned eighth aspect, characterized in that the plate is fixedly mounted on one end portion of the main spool by means of a tightening fixture.

According to a tenth aspect of the present invention, there is provided a flow rate control valve device as set forth in the above-mentioned ninth aspect, characterized in that the plate is formed integrally with one end of the main spool.

To achieve the above-mentioned objects, according to an eleventh aspect of the present invention, there is provided a flow force reduction structure for a spool valve having a main spool slidably mounted in a valve hole perforated in the valve body thereof in such a manner that a main port for flow rate controlling purposes which communicates with a pressure chamber of an actuator may be connected with or disconnected from a drain port kept at a low pressure along a small diameter portion interposed between large diameter portions formed on both sides thereof, the main spool having a plurality of notch grooves formed axially on the peripheral surface of the large diameter portion on one side thereof, characterized in that the main spool has a first through-hole perforated diametrically so as to connect to the notch grooves, and a second through-hole perforated diametrically at a position out of phase with the first through-hole in the diametrical and axial directions thereof so as to overlap the first through-hole.

According to a twelfth aspect of the present invention, there is provided a flow force reduction structure for a spool valve as set forth in the above-mentioned eleventh aspect, characterized in that the main spool has a plurality of the first through-hole and a plurality of the second through-holes perforated therein.

The above-mentioned and other objects, aspects and advantages of the present invention will become apparent to those skilled in the art by making reference to the following detailed description and the accompanying drawings in which preferred embodiments incorporating the principles of the present invention are shown by way of example only.

DETAILED DESCRIPTION OF PREFERRED EMBODIMENTS

The present invention will now be described in detail below by way of several embodiments thereof with reference to the accompanying drawings.

Figure 2:
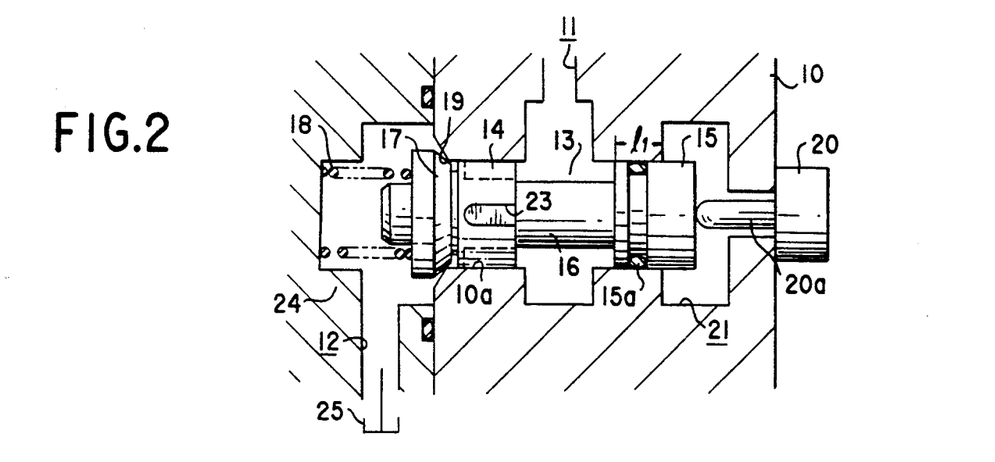
FIG. 2 is a schematic, sectional view showing a first embodiment of the flow rate control valve device according to the present invention.

In FIG. 2, a valve body 10 has a main spool 13 adapted to connect or disconnect a main port 11 for flow rate controlling purposes with or from a drain port 12 kept at a low pressure, which is inserted or fitted therein so as to be slidably moved in and along a valve hole 10a. The main spool 13 has a first large diameter portion 14, a second large diameter portion 15, and a small diameter portion 16. The large diameter portion 14 has a seat, for example, a truncated-conical seat 17 formed thereon. The main spool 13 is biased by a spring 18 to the right to allow its seat 17 to make a pressure contact with a seat poppet 19. Further, a movable rod 20a of an electrical actuator 20 mounted on the above-mentioned valve body 10 is kept in contact with the second large diameter portion 15. The arrangement is made such that the main spool 13 is pushed to the left through the action of a thrust given by the movable rod 20a, which is in proportion to the electric current supplied to the electrical actuator 20, against the resilient force of the spring 18, so as to disengage its truncated-conical seat 17 from the seat poppet 19 so that fluid under pressure may flow from the main port 11 through notch grooves 23 formed on the first large diameter portion 14 into a drain port 12 kept at a low pressure.

The above-mentioned spring 18 is supported by a spring retainer 24 mounted on the valve body 10, and the drain port 12 kept at a low pressure is formed in the spring retainer 24 and communicates with a fluid reservoir or tank 25.

Figure 3:
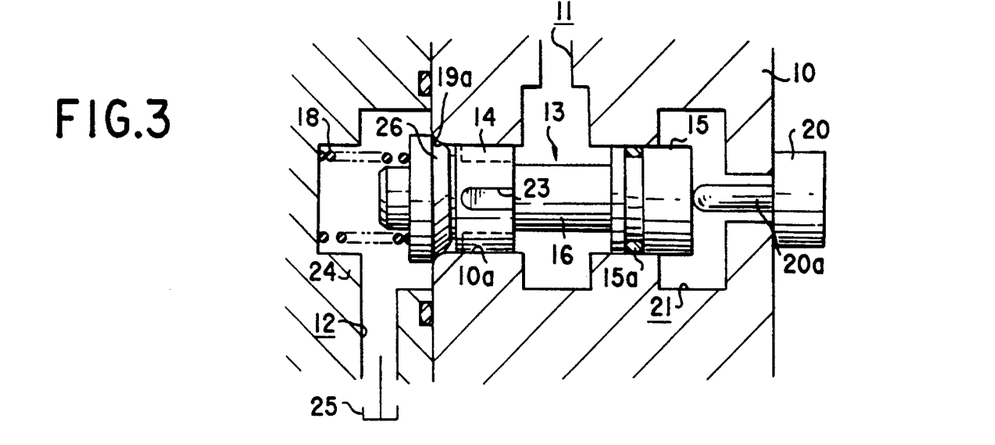
FIGS. 3 and 4 are schematic, sectional views showing modified embodiments, respectively, of the first embodiment shown in FIG. 2 having differently configured seat portions.

Further, as shown in FIG. 3, the seat on the main spool 13 may be in the form of a spherical seat 26, and the seat poppet on the valve body may be in the form of a spherical seat poppet 19a, or alternatively, a combination of the seat 26 and the seat poppet 19a may be used.

Figure 4:
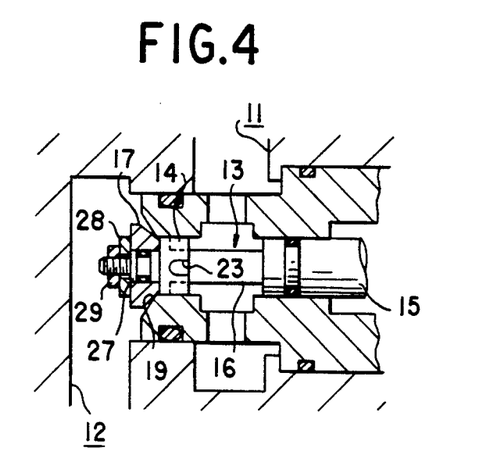

Further, as shown in FIG. 4, it is possible to form a small diameter projection 27 integrally with the first large diameter portion 14 of the main spool 13, and mount a truncated-conical seat 17 on the small diameter projection 27 by fitting the seat 17 on the projection 27 and tightening a nut 29 through a retainer 28.

Thus, when the valve is in its holding or neutral condition, the main spool 13 is pushed by the resilient force of the spring 18 to the right so as to cause its truncated-conical seat 17 to make pressure contact with the seat poppet 19 so as to cut off the communication between the main port 11 and the drain port 12 kept at a low pressure, thereby eliminating the possibility of the internal leakage, i.e., fluid leakage from the main port 11 into the drain port 12 kept at a low pressure.

In this case, the leakage of pressurized fluid into a chamber 21 in which the movable rod 20a extends can be minimized by reducing the clearance between the second large diameter portion 15 and the valve hole 10a and increasing the fit dimension $l_1$. The leakage of fluid can be completely eliminated by mounting a seal ring 15a in the recess of the second large diameter portion 15.

Further, when the value of electric current supplied to the electrical actuator 20 is increased, the thrust exerted on the movable rod 20a is increased so as to move the main spool 13 to the left against the resilient force of the spring 18 to disengage, first of all, the truncated-conical seat 17 from the seat poppet 19, and then communicate the notch grooves 23 formed on the first large diameter portion 14 with the low pressure drain port 12 to thereby allow the fluid under pressure in the main port 11 to commence to flow gradually through the notch grooves 23 into the drain port 12 kept at a low pressure and then into the fluid tank 25.

Consequently, the flow rate of fluid under pressure through the main port 11 will be set at a predetermined value which is decided by the resilient force of the spring 18 and the thrust given by the movable rod 20a of the electrical actuator 20. Stating in brief, since the size of the notch grooves 23 and the resilient force of the spring 18 are preset so as to cause the rate of pressurized fluid flow from the main port 11 into the drain port 12 kept at a low pressure to vary in response to the force pushing the main spool 13 to the left so that the rate of pressurized fluid flow from the main port 11 into the drain port 12 kept at a low pressure can be controlled at a high accuracy.

Further, since the main spool 13 is pushed to the left by applying the thrust given by the electrical actuator 20 onto the right hand end face of the second large diameter portion 15 of the main spool 13, when the value of electric current supplied to the electrical actuator 20 is increased the thrust is increased immediately so as to move the main spool 13 to the left, the response of the valve is enhanced and the force pushing the main spool 13 can be controlled accurately and finely so that the flow rate of fluid under pressure can be controlled at a high accuracy.

Furthermore, since the flow force resulted from the fluid flow through the notch grooves 23 and the load of the spring 18 are utilized for the operation of the valve, fluid flow through the valve can be kept at a flow rate which is in proportion to the thrust developed by a solenoid, but independent of the pressure in the main port 11 so as to provide a pressure compensating type flow rate control valve which enables the flow rate of fluid under pressure therethrough to be controlled at much higher accuracy.

Figure 5:
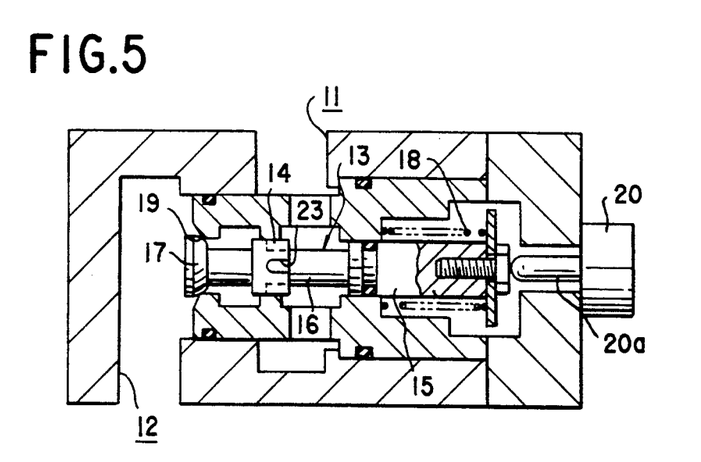
FIG. 5 is a schematic, sectional view showing a second embodiment of the flow rate control valve device according to the present invention.

FIG. 5 shows a second embodiment of the present invention wherein the first large diameter portion 14 of the main spool 13 and the truncated-conical seat 17 are axially spaced apart by a predetermined distance with each other.

Incidentally, in the flow rate control valves having the constructions of the above-mentioned embodiments, the main spool 13 is subjected to a flow force in such a direction as to cut off the communication between the main port 11 and the drain port 12 which results from the pressurized fluid flowing from the main port 11 through the notch grooves 23 and into the drain port 12. The magnitude of the flow force is in proportion to the flow rate multiplied by the flow velocity.

Therefore, if a big flow force is developed in such a condition as the pilot pressure is low and the force pushing the main spool 13 to the left is small, then there is a tendency of the main spool 13 moving to the right to thereby cut off the communication between the main port 11 and the drain port 12, and therefore it is necessary to increase the magnitude of the pushing force applied to the other end face of the main spool 13 taking the flow force into consideration, which requires, in turn, to increase correspondingly the capacity of the electrial actuator or that of the pilot fluid pressure supply source, which is not preferable.

Further, in cases the difference between the pressure of fluid under pressure which is input into the main port 11 and the fluid pressure within the drain port 12 is high or low, even if the area of the opening in the notch grooves 23 in the passage where the pressurized fluid flows from the main port 11 into the drain port 12 is kept at the same value, the flow velocity of pressurized fluid will vary with the pressure differential between the main port 11 and the drain port 12. Therefore, the magnitude of the flow force exerted on the main spool 13 is big when the pressure differential is high, and small when the pressure differential is low.

Consequently, in case such a flow control valve is installed in an implement driving hydraulic circuit of a construction equipment, the difference between the pressure in the main port 11 and that in the drain port 12 will vary to a large extent so that when the pressure differential is high the main spool 13 is moved in such a direction as to cut off the communication between the main port 11 and the drain port 12, thus lowering the accuracy of controlling the flow rate of fluid under pressure.

To cope with such difficulties, according to the present invention, there is further provided a flow rate control valve having a high operational accuracy which is arranged such that even when the difference between the pressure in the main port and that in the drain port becomes high so as to increase the flow force exerted on the main spool there is no possibility of the main spool moving in such a direction as to cut off the communication between the main port and the drain port.

Figure 6:
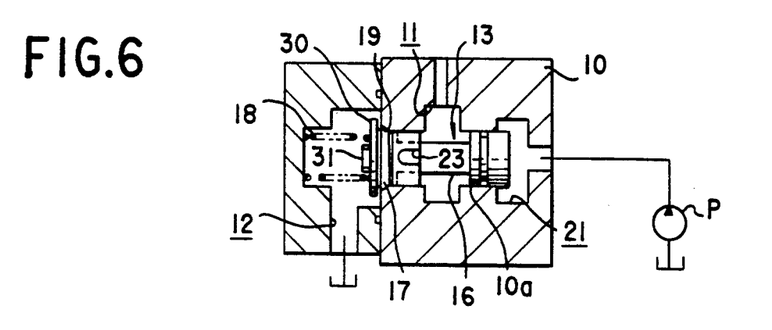
FIGS. 6 and 7 are schematic, sectional views showing a third and a fourth embodiment of the present invention to which flow force reduction measures are applied.

As shown in FIG. 6, the main spool 13 has a disc-shaped plate 30 mounted by means of a bolt 31 on the seat 17 on the side of the drain port 12, and the diameter of the plate 30 is larger than the diameters of the seat 17 and the seat poppet 19. The arrangement is made such that the pressurized fluid flowing out from tile space between the seat 17 and the seat poppet 19 may impinge on the disc-shaped plate 30.

Such being the arrangement, part of the fluid under pressure flowing from the main port 11 into the drain port 12 will impinge on the plate 30 so as to give the latter a leftward force, in brief, a pushing force in a direction opposite to that of the flow force, and as a result, the tendency of movement of the main spool 13 to the right, i.e., in the direction to cut off the communication between the main port and the dram port, which results from the flow force, is reduced so that the pilot pressure can be reduced, and also since the leftward pushing force exerted on the main spool 13 will increase in proportion to the pressure exerted on the plate 30, if tile pressure within the main port 11 is increased so as to increase the flow force, the leftward pushing force will also increase so that the flow force can be offset by the pushing force.

Figure 7:
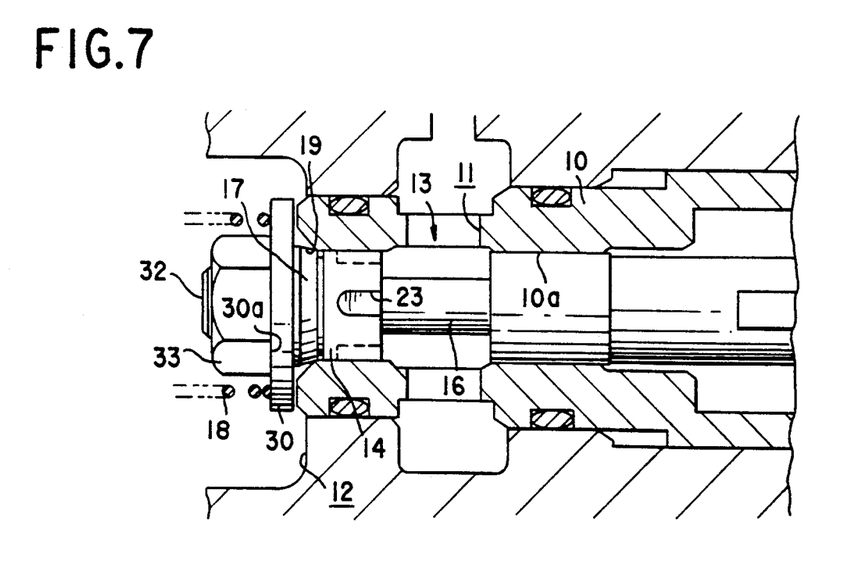
Figure 8A:
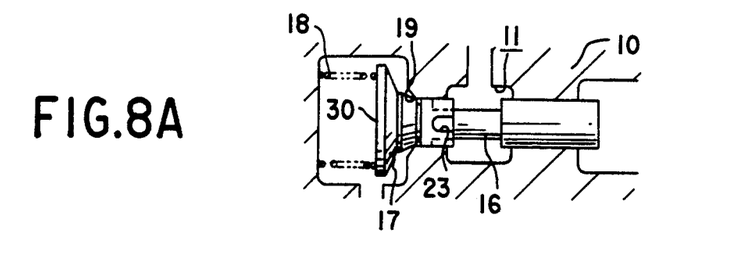
FIGS. 8A to 8D inclusive are sectional views showing modified embodiments, respectively, to which flow force reduction measures are applied.
Figure 8B:
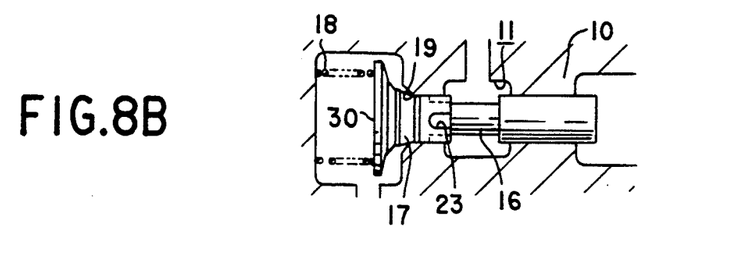
Figure 8C:
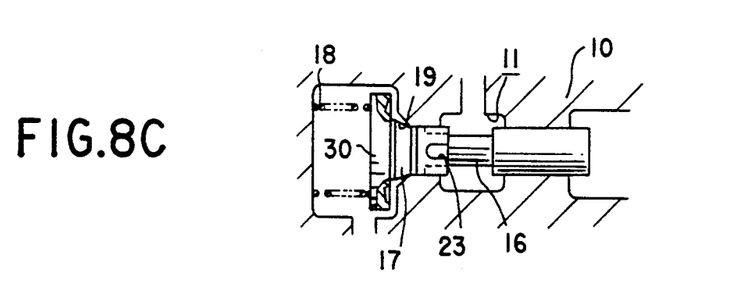
Figure 8D:
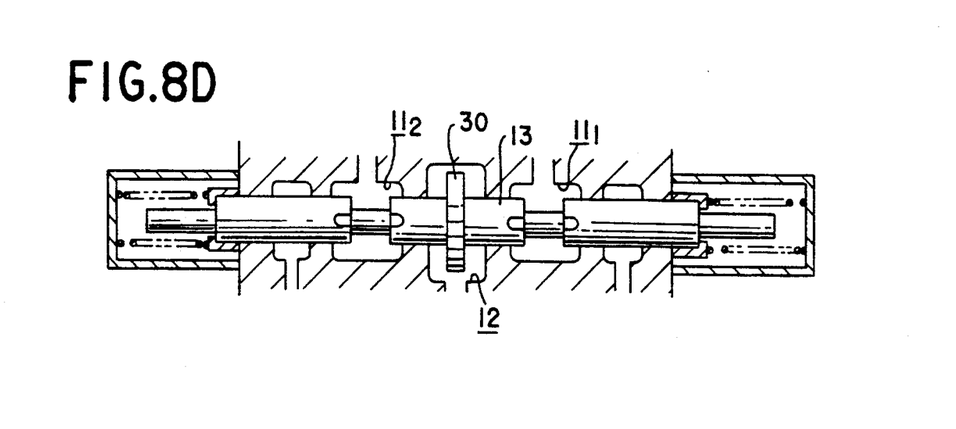

Further, as shown in FIG. 7, it is possible to form a screw-threaded portion 32 integrally with the end face of the seat 17 formed on the main spool 13, insert the screw-threaded portion 32 into a hole 30a formed in the plate 30, and tighten the plate 30 by threadably engaging a nut 33 with the screw-threaded portion 32, or alternatively, as shown in FIGS. 8A, 8B and 8C, the plate 30 may be formed integrally with the main spool 13, and as a further alternative, as shown in FIG. 8D, in case fluid under pressure is caused to flow from main ports 11₁ and 11₂ into the drain port 12, the plate 30 may be formed integrally with the main spool 13.

Further, as flow force reduction structures for use in spool valves, spool structures as shown in FIGS. 9 to 11A can be envisaged. Stating in brief, in these drawings, the large diameter portin 14 of the main spool 13 has notch grooves 23 formed in the outer periphery thereof so as to open oil the end face 14a on the small diameter portion 16 thereof, and a diametrically extending first through-hole 34 is perforated so as to connect to the notch grooves 23, and further a second through-hole 35 in perforated 90 degrees out of phase with the first through-hole 34 and at an axially spaced-apart position in such a manner as to overlap the first through-hole 34.

Figure 9:
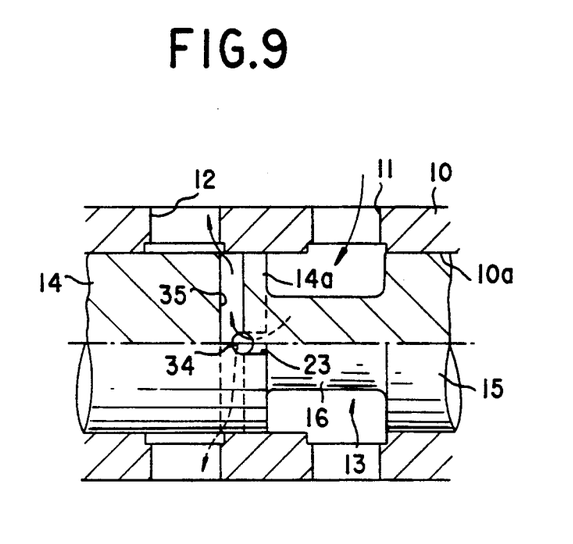
FIG. 9 is a schematic, sectional view showing principal parts of a spool valve having a flow force reduction structure.
Figure 10:
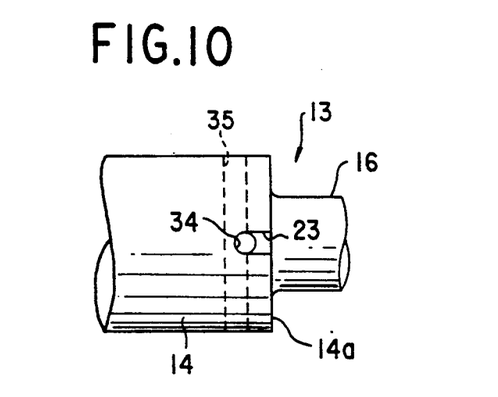
FIG. 10 is a plan view showing a fragment of the principal parts of the spool portion as shown in FIG. 9.

In the above-arrangement, since the fluid under pressure which flows into the main port 11 will flow along the small diameter portion 16 and through the notch grooves 23, the first and second through-holes 34 and 35, if the main spool 13 is moved to the left, fluid under pressure will flow through the first and second through-holes 34 and 35, in turn, and then into the drain port 12 so that fluid under pressure may flow in directions at right angles to the axial direction of the main spool 13, thereby reducing the flow force.

Figure 11A:
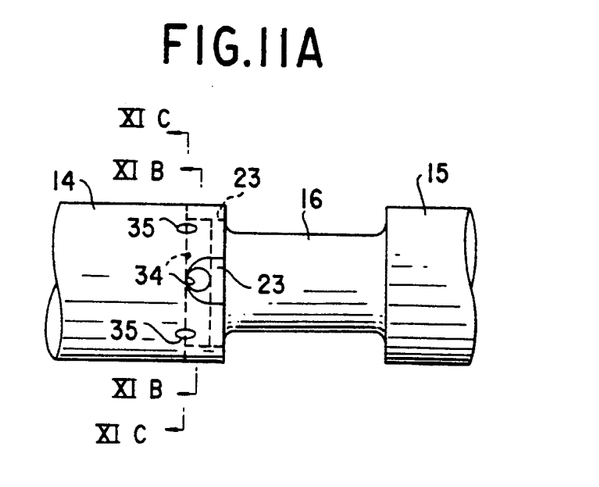
FIG. 11A is a plan view showing a fragment of principal parts of another embodiment of the spool having a flow force reduction structure.
Figure 11B:
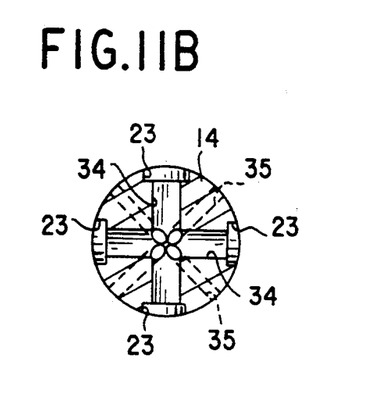
FIGS. 11B and 11C are sectional views taken along lines XIB—XIB and lines XIC—XIC, respectively.
Figure 11C:
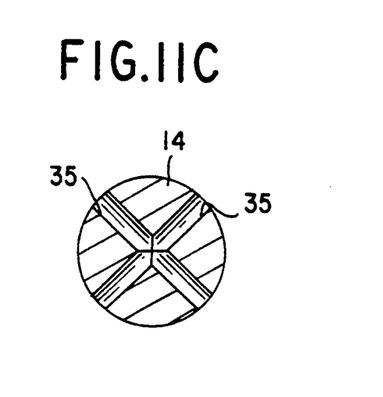

Further, three or more through-holes may be perforated as shown, for example, in FIGS. 11A, 11B and 11C, respectively.

What is claimed is:

1. A flow rate control device, comprising:

a valve body having a valve hole formed therein, a main port for controlling a flow rate of pressurized fluid, a pressure chamber which communicates with said main port, and a drain port which is kept at a low pressure;

a main spool slidably mounted in said valve hole, said main spool enabling said drain port to connect with or disconnect from said pressure chamber through sliding movement of itself;

a plurality of notch grooves formed axially on an outer peripheral surface of a large diameter portion of said main spool;

a seat formed on one end side of said main spool;

a spring interposed between one innermost end face of said valve hole and one end face of said main spool said spring being adapted to urge said seat to pressurably contact with a seat poppet of said valve body;

pushing means for pushing said main spool from the other end face thereof opposite the end face having said spring, against a resilient force of said spring, so that said seat becomes disengaged from said seat poppet to allow said pressure chamber to communicate through said notch grooves with said drain port; and a plate member on said main spool at a location in said drain port for causing such a pressurized flow directed through said notch grooves from said pressure chamber towards said drain port as flowing firstly in a substantially radial direction of said main spool and subsequently into said drain port so that part of said pressurized fluid impinges on said plate for exerting a force urging said main spool via said plate in the direction disengaging said seat from said seat poppet against a force of said spring and a flow force acting between said seat and said seat poppet for at least canceling said flow force.

2. A flow rate control valve device as claimed in claim 1, wherein said pushing means is an electrical actuator having a movable rod adapted to engage with an end face of said main spool opposite the end face having said spring so as to give a thrust to said main spool.

3. A flow rate control valve device as claimed in claim 1, wherein said pushing means comprises a pressure chamber in which an end portion of said main spool opposite the end portion having said spring is accommodated, and a pilot pressure supplying means for supplying pilot fluid under pressure from a pilot pump.

4. A flow rate control valve device as claimed in claim 1, characterized in that said plate member is fixedly mounted on one end portion of said main spool by means of a tightening fixture.

5. A flow rate control valve device as claimed in claim 1, characterized in that said plate member is formed integrally with one end portion of said main spool.

* * * * *

UNITED STATES PATENT AND TRADEMARK OFFICE
CERTIFICATE OF CORRECTION

PATENT NO. : 5,271,430
DATED : December 21, 1993
INVENTOR(S) : Mauyama et al

It is certified that error appears in the above-indentified patent and that said Letters Patent is hereby corrected as shown below:

On the cover page, Item [75], "Jun Muruyama" should be --Jun Maruyama--.

Signed and Sealed this

Sixteenth Day of August, 1994

Attest:

BRUCE LEHMAN

Attesting Officer   Commissioner of Patents and Trademarks